July 26, 1932.  J. BAILEY  1,868,480
HANDLING GLASS ARTICLES
Filed May 1, 1929  5 Sheets-Sheet 1
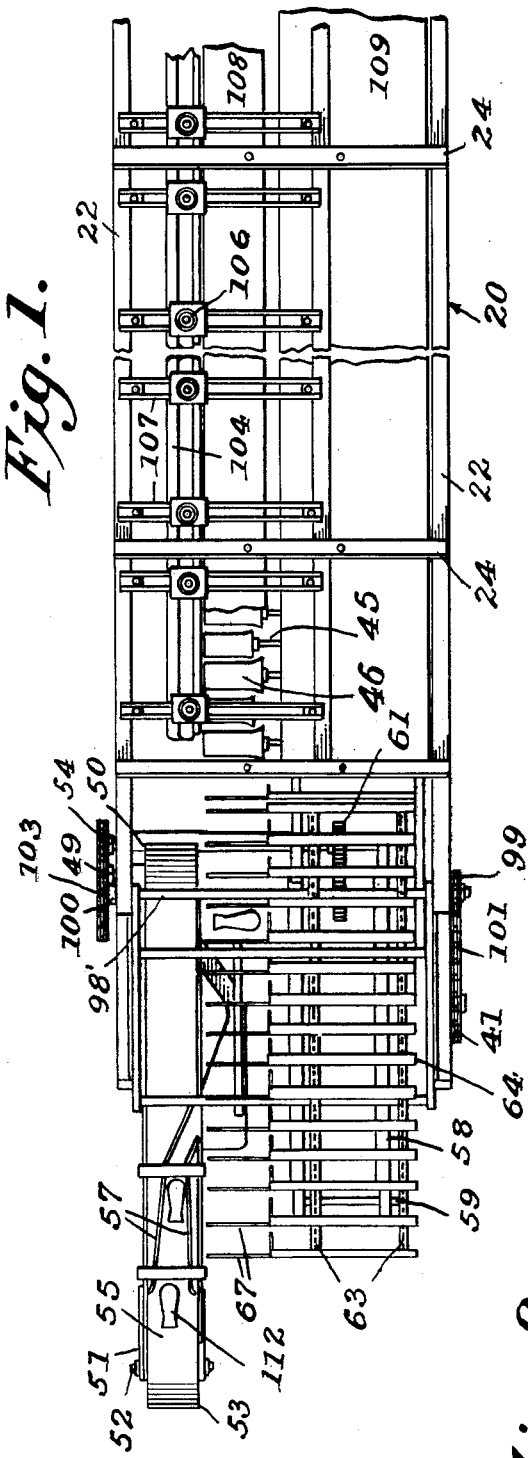
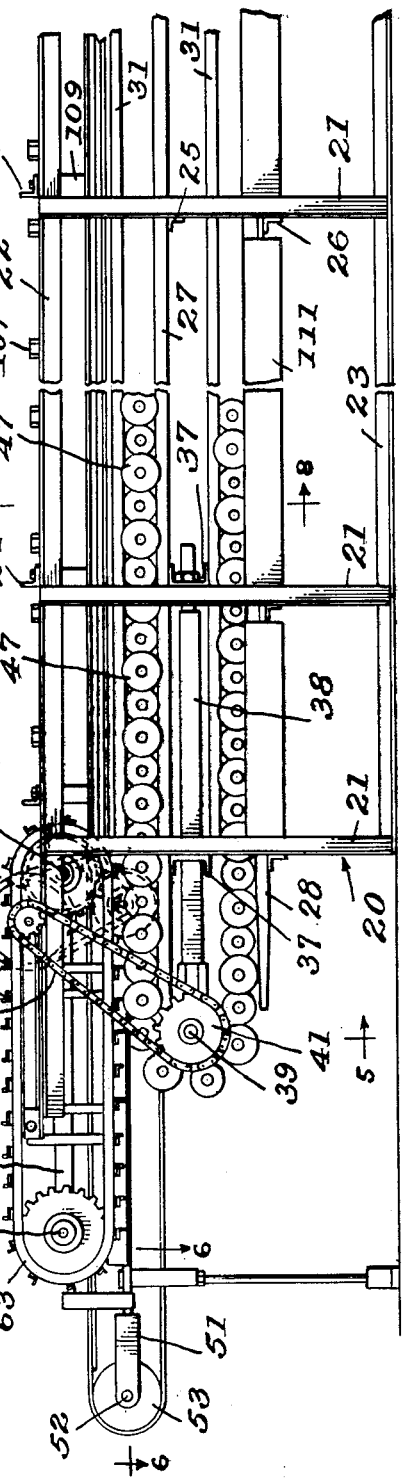
INVENTOR
JAMES BAILEY.
BY
ATTORNEYS

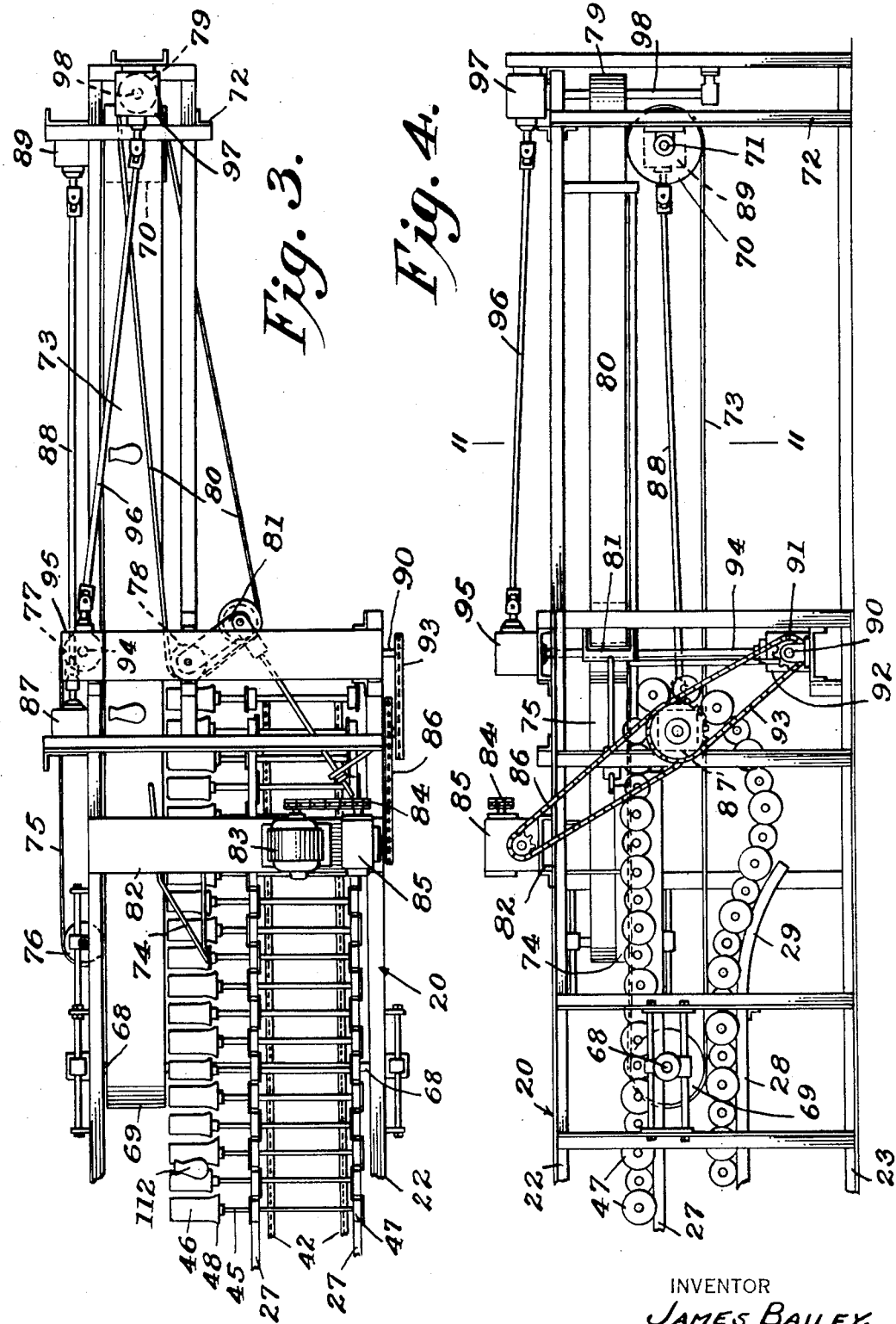

INVENTOR
JAMES BAILEY.
BY
ATTORNEYS

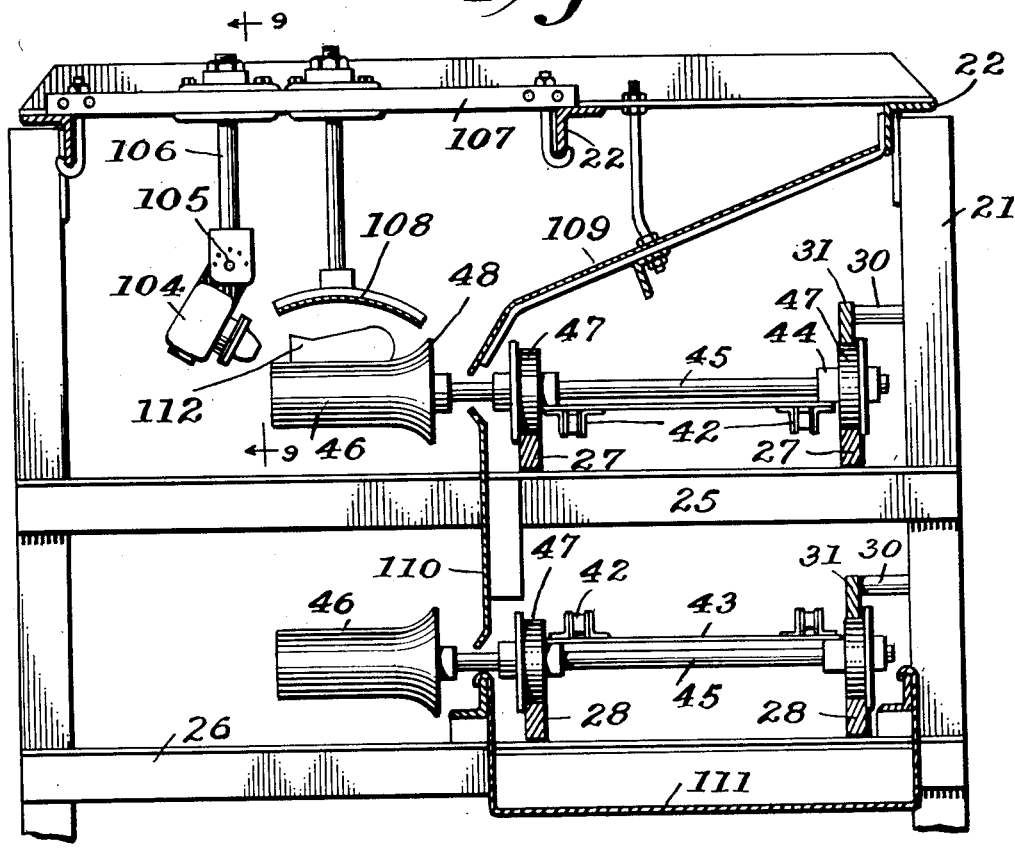
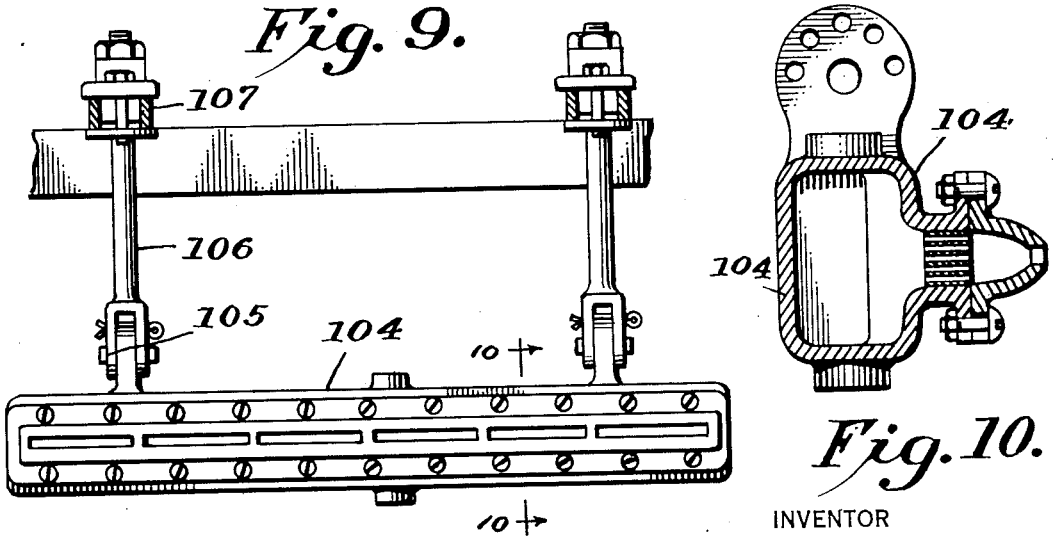

July 26, 1932.  J. BAILEY  1,868,480
HANDLING GLASS ARTICLES
Filed May 1, 1929    5 Sheets-Sheet 5

INVENTOR
JAMES BAILEY.
BY
ATTORNEYS.

Patented July 26, 1932

1,868,480

UNITED STATES PATENT OFFICE

JAMES BAILEY, OF CORNING, NEW YORK, ASSIGNOR TO CORNING GLASS WORKS, OF CORNING, NEW YORK, A CORPORATION OF NEW YORK

HANDLING GLASS ARTICLES

Application filed May 1, 1929. Serial No. 359,703.

This invention relates to improvements in handling glass articles and particularly to a conveyor for advancing them through various stages of treatment.

The object of the invention is to rotate articles during their progress so as to uniformly expose them to the treatment selected.

Another object is to prevent breakage of fragile articles during their deposit on or discharge from the conveyor.

A further object is to avoid injury to the conveyor supporting and advancing mechanism through exposure to the bath in which the articles are treated.

Among its features my invention involves the successive mounting of a series of carriages upon a trackway, the carrying of rollers on the axle shafts of the carriage and thereby forming a ware carrying conveyor when the carriages are in position on the trackway, the advancing of the carriages along the trackway so that rotation will be imparted to the rollers as they advance, the depositing of ware onto the rollers forming the conveyor in such a manner that rotation will be imparted to it during its progress, the discharging of the ware from the conveyor without breakage and the shielding of the conveyor supporting and advancing mechanism from the effects of the article treating bath.

The above and other objects may be attained by the use of my invention which consists in the novel construction, combination, and arrangement of parts as fully set forth in the following specification, claimed, and illustrated in the accompanying drawings, in which:

Fig. 1 is a top plan view of the loading end of a conveyor constructed in accordance with this invention;

Fig. 2 is a front view in elevation of Fig. 1;

Fig. 3 is a top plan view of the discharge end of the conveyor illustrated in Figs. 1 and 2;

Fig. 4 is a front view in elevation of Fig. 3;

Fig. 8 is a transverse sectional view on an enlarged scale taken on the line 8—8 of Fig. 2;

Fig. 9 is an enlarged sectional view taken on the line 9—9 of Fig. 8;

Fig. 10 is an enlarged transverse sectional view taken on the line 10—10 of Fig. 9;

Frame

Figure 5:
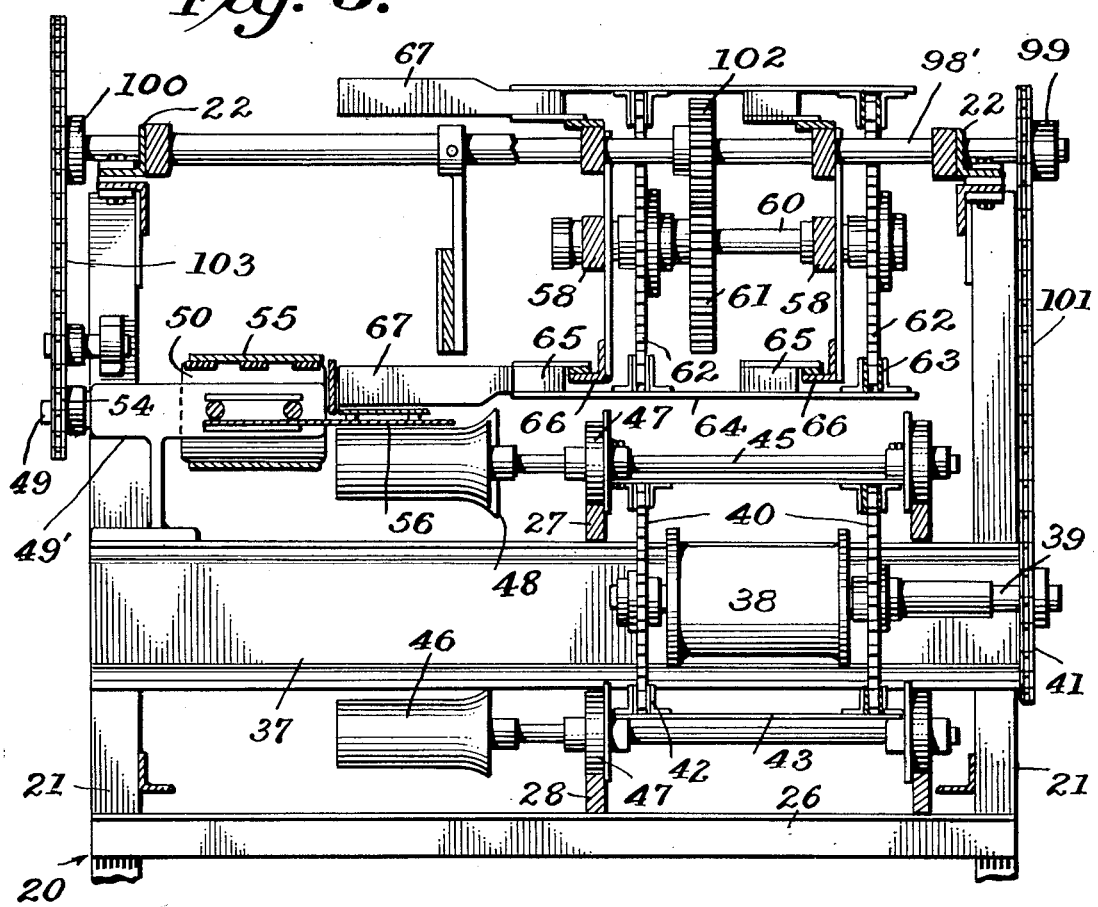
Fig. 5 is a transverse sectional view on an enlarged scale taken on the line 5—5 of Fig. 2.

Referring to the drawings in detail, the frame designated generally 20, comprises a plurality of standards 21 which are connected at their upper and lower ends by longitudinally extending rails 22 and 23 respectively. Connecting the upper ends of the sides of the frame are transverse bars 24 which cooperate with intermediate cross bars 25 and 26 in holding the sides of the frame in spaced parallel relation. Supported on the bars 25 are track-rails 27 upon which run the carriages of a conveyor to be later described in detail. Similar track rails 28 are supported directly below the track rails 27 on the transverse bars 26 and the ends of these rails are downturned as at 29 near the delivery end of the machine for a purpose to be more fully described. Inwardly projecting studs 30 are secured to the standards 21 on the front side of the machine and support at their inner ends guide rails 31 which prevent the carriages from leaving the track rails.

Figure 11:
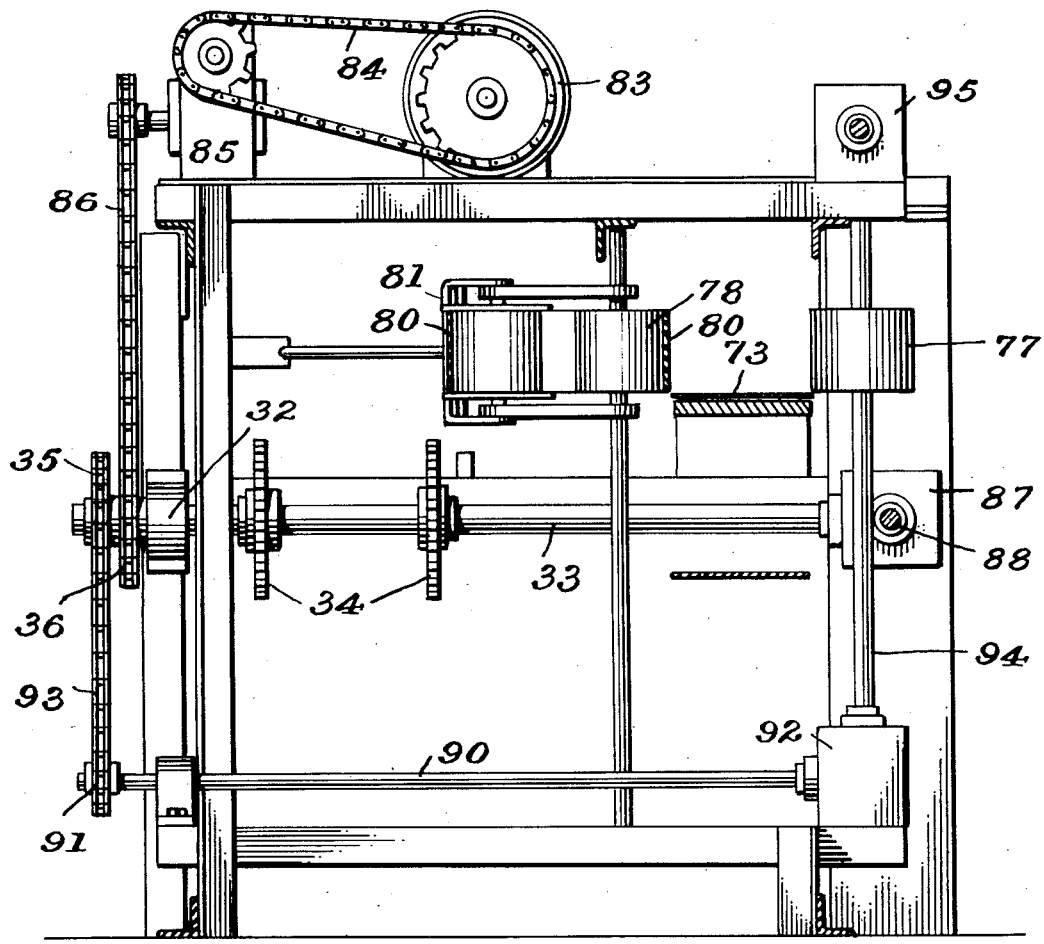
Fig. 11 is a transverse sectional view taken on the line 11—11 of Fig. 4, looking toward the conveyor.
Figure 12:
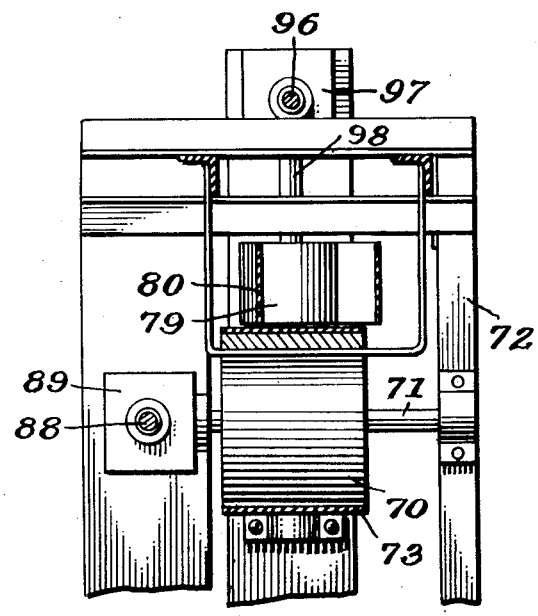
Fig. 12 is a fragmentary sectional view on an enlarged scale taken on the line 11—11 of Fig. 4, looking away from the conveyor.

Secured adjacent the discharge end of the frame 20 is a bracket 32 (Fig. 11) in which a shaft 33 is journalled. This shaft supports a pair of spaced sprockets 34 and carries, adjacent one end, drive sprockets 35 and 36. Supported adjacent the loading end of the machine on transversely extending channel bars 37 (Fig. 5) which are secured to the standards 21 intermediate the pairs of track rails 27 and 28 is an adjustable bracket 38 which supports at its outer end a transverse shaft 39 carrying a pair of spaced sprockets 40. A sprocket 41 is fixed adjacent one end of the shaft 39 for driving the loading mechanism as will be more fully hereinafter described.

Conveyor

Trained over both pairs of sprockets 34 and 40 are chains 42 to which are riveted, or otherwise secured in spaced intervals, connecting bars 43 carrying, adjacent opposite ends, collars 44 for rotatably receiving axle shafts 45, each of which carries at one end a ware supporting roller 46. Secured to the axle shafts 45, adjacent opposite ends of the bars 43, are flanged wheels 47 which, as illustrated, run on the track rails 27 and 28, previously described. Alternate ware supporting rollers 46 are provided with relatively wide flanges 48 which serve to prevent the articles of ware from dropping off the rollers. As previously described (see Fig. 4), the ends of the track rails 28, adjacent the discharge end of the machine, are down-turned as at 29 to permit the carrier chains 42 to sag and take up slack, it being understood that under varying heat conditions the length of the chains will vary and consequently some means for compensating for such variation is required.

Loader

Figure 6:
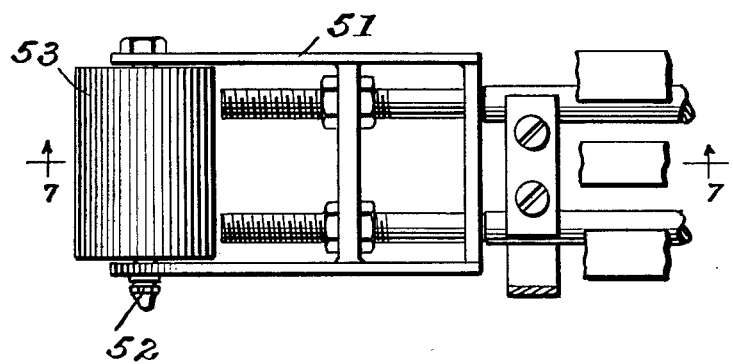
Fig. 6 is an enlarged horizontal sectional view taken on the line 6—6 of Fig. 2 showing the supporting roller for the loading belt.
Figure 7:
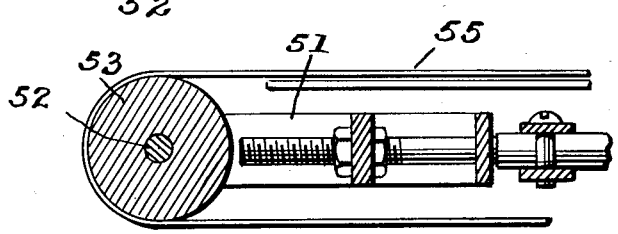
Fig. 7 is a longitudinal sectional view taken on the line 7—7 of Fig. 6.

Supported on a shaft 49 (Fig. 5), which is supported in a bearing 49' near the loading end of the machine, is a roller 50, and supported in adjustable brackets 51 (Figs. 2, 6 and 7), beyond the loading end of the machine, is a shaft 52 upon which a roller 53 is mounted. A drive sprocket 54 is secured adjacent the outer end of the shaft 49 in order that the roller 50 may be driven. A receiving belt 55 runs over the rollers 50 and 53 and supported adjacent one side of and below the upper run of said belt is a table 56. Supported above the upper run of the belt 55 are suitable guides 57 which are arranged to cause articles which have been previously deposited on the belt to be discharged from the belt and onto the table. As shown in Fig. 5, the table is disposed slightly above the plane of the conveyor so that the articles upon leaving the table will be gently deposited upon the conveyor. Supported in a plane, above and to one side of the table 56 in a frame 58, are shafts 59 and 60, the latter being provided intermediate its ends with a drive gear 61. Each of the shafts 59 and 60 is provided with sprockets 62 over which chains 63 run, and secured to the chains in spaced parallel relation are transverse tie bars 64 which are provided with guides 65 for engagement with guide rails 66 carried by the frame 58. Secured to the ends of the tie bars 64 adjacent the table 56 are fingers 67 which are adapted to engage the articles which have been deposited on the table from the receiving belt 55, and advance them toward the conveyor. In this manner uniform loading of the conveyor may be accomplished.

Delivering mechanism

Adjustably supported on the frame 20, adjacent the discharge end of the machine, is a shaft 68 carrying a roller 69. A roller 70 is supported in the same horizontal plane with the roller 69 on a shaft 71 which is mounted in a suitable frame work 72 beyond the discharge end of the frame 20. Extending over the rollers 69 and 70 is a delivery belt 73, the upper run of which is to one side of and slightly below the plane of the conveyor. A stationary deflector 74 is arranged slightly above the conveyor near its discharge end and in such a position that as the articles on the conveyor advance, they will be gently urged onto the belt 73. A vertically disposed belt 75 runs over rollers 76 and 77 which are arranged adjacent the outer edge of the belt 73 and this belt serves as a stop to prevent the articles from rolling off of the edge of the belt 73 when they are discharged from the conveyor.

Running over a vertically disposed idle roller 78 and a vertically disposed drive roller 79 is a discharge belt 80 which, as shown, extends diagonally across the belt 73, it being understood that any suitable belt tightener 81 is employed to keep the belt 80 taut.

Drive

Mounted on a suitable support, (Figs. 3, 4 and 11), such as the channel member 82, is a prime mover such as the motor 83. This is connected by a chain 84 to a reduction gear 85. A chain 86 connects the reduction gear 85 with the drive sprocket 36. It will thus be seen that when the motor is operated the sprockets 34 will operate the conveyor. Connected to the end of the shaft 33 opposite that carrying the sprockets 35 and 36 is a gear box 87 which is connected by a longitudinal shaft 88 to a gear box 89 which, in turn, is connected to the shaft 71 of the drive roller 70 over which the belt 73 runs. It will thus be seen that when the conveyor is set in motion, the belt 73 will be driven.

Extending transversely of the delivery end of the machine is a jack shaft 90 carrying at one end a sprocket 91 and connected at its opposite end to a gear box 92. A drive chain 93 connects the sprockets 35 and 91 so that when the shaft 33 is driven, the jack shaft will also be driven. Extending upwardly from the gear box 92 is a shaft 94 upon which the drive roller 77 for the belt 75 is mounted. The upper end of the shaft 94 terminates in a gear box 95 which is connected by means of a substantially horizontal shaft 96 to a gear box 97 mounted at the upper end of the frame 72. A vertically disposed shaft 98 extends downwardly from the gear box 97 and supports the drive roller 79 of the belt 80, above described.

Extending transversely of the machine at its loading end (Fig. 5) is a jack shaft 98' carrying at opposite ends sprockets 99 and 100. Running over the sprockets 41 and 99 is a chain 101 by means of which the shaft 98 is driven when the conveyor is in operation. Secured intermediate the ends of the shaft 98' in meshing engagement with the gear 61 is a pinion 102 and trained over the sprockets 54 and 100 is a chain 103. It will thus be seen that when the jack shaft 98' is set in motion, the receiving belt 55 and the chains 63 will be driven. Obviously movement of the chains 63 will cause the fingers to travel longitudinally of the table 56 and sweep the articles, which have been deposited thereon, from the receiving belt onto the loading end of the conveyor.

*Treating apparatus and guard plates*

While any suitable form of treatment may be employed as the articles progress upon the conveyor, I find the device admirably suited to the annealing of thin blown glassware such as bulbs, beakers, and tumblers. For such treatment, I use annealing burners 104 which are preferably adjustably suspended as at 105 from brackets 106 which, in turn, are supported on cross bars 107 which are adjustably supported on the longitudinal rails 22. In order to confine the heat of the burners 104 and direct it onto the ware, I find it convenient to suspend a hood 108 from the cross bars 107 and while I have shown it as being curved, it is obvious that it may take other suitable forms and be arranged in other positions to suit the form of treatment adopted.

Since differing treatments may affect the operating mechanism of the conveyor, I prefer to employ guard plates 109 and 110 to enclose the track rails 28 and carriages 42 and protect them from the effects of the heat. This protects the conveyor supporting and advancing mechanism from the effects of the treating bath and prevents the burning out of any lubricants used and the consequent wear and loss of efficiency resulting therefrom. I also find it convenient to suspend a drip pan 111 beneath the carriages and their operating mechanism in order to catch the overflow of lubricants from the mechanism.

*Operation*

Articles to be treated such as bulbs 112 are deposited on the receiving belt 55 and are carried forward thereby until they encounter the guides 57 when they are discharged onto the table 56. Here they are engaged by the fingers 67 and advanced toward the conveyor thereby. Upon being discharged from the end of the table 56, the bulbs are deposited on the conveyor and then their rolling advance commences. Progressing through the various stages of treatment in rolling contact with the conveyor, it will be seen that uniform treatment of the bulbs is effected. At the discharge end of the conveyor, the bulbs encounter the deflector 74 which causes them to be deposited onto the delivery belt 73 upon which they travel until they are dislodged by the discharge belt 80 into any suitable receiver (not shown).

While in the foregoing, I have shown and described the preferred embodiment of my invention, it is to be understood that minor changes in the details of construction, combination, and arrangement of parts may be resorted to without departing from the spirit and scope of the invention as claimed.

I claim:

1. In an apparatus for presenting articles to an annealing bath, article supporting rollers movable in a horizontal path, means for advancing the rollers, said means being located to one side of the path of movement of the rollers.

2. In an apparatus for presenting articles to an annealing bath, article supporting rollers movable in a horizontal path, means for advancing the rollers located to one side of the path of movement of the rollers, means for supporting and rotating the rollers as they advance.

3. In an apparatus for presenting articles to an annealing bath, article supporting rollers movable in a horizontal path, means for advancing the rollers and means for supporting and rotating the rollers as the conveyor advances the roller advancing means and the roller supporting and rotating means being located to one side of the path of movement of the rollers.

4. In an apparatus for presenting articles to an annealing bath, article supporting rollers movable in a horizontal path, means for advancing the rollers, means for rotating the rollers as they advance, both of said last named means being located to one side of the path of movement of the rollers, and means for depositing articles on the rollers in rolling contact with them.

5. In an apparatus for presenting articles to an annealing bath, article supporting rollers movable in a horizontal path, and an endless carrier for moving the rollers, said carrier being located to one side of the path of movement of the rollers.

6. In an apparatus for presenting articles to an annealing bath, article supporting rollers movable in a horizontal path, an endless carrier for moving the rollers, and means for rotating the rollers as they advance, said carrier and rotating means being located to one side of the path of movement of the rollers.

7. In an apparatus for presenting articles to an annealing bath, article supporting rollers movable in a horizontal path, an endless carrier for moving the rollers, means for rotating the rollers as they move and means for depositing articles on the rollers in rolling contact with them, said carrier and roller rotating means being located to one side of the path of movement of the rollers.

8. In an apparatus for presenting articles to an annealing bath, a stationary support, article supporting rollers supported on the support and movable in a horizontal path at one side of said support and means for moving the rollers.

9. In an apparatus for presenting articles to an annealing bath, a stationary support, article supporting rollers supported on the support and moving in a horizontal path at one side of the support, means for moving the rollers, and means on the support for causing the rollers to rotate as they move.

10. In an apparatus for presenting articles to an annealing bath, a stationary support, article supporting rollers movable in a horizontal path at one side of the support, means for moving the rollers, and wheels movable along the support said wheels carrying the rollers and causing them to rotate as they move.

11. In an apparatus for presenting articles to an annealing bath, article supporting rollers movable in a horizontal path, an endless carrier for moving the rollers, means for rotating the rollers as they move and means for depositing articles on the rollers in rolling contact with them, the carrier and rotating means being located to one side of the path of movement of the rollers.

12. In an apparatus for presenting articles to an annealing bath, article supporting rollers movable in a rectilinear path through the bath and roller supporting and advancing means wholly outside of the path of travel of the rollers.

13. In an apparatus for presenting articles to an annealing bath, article supporting rollers movable in a rectilinear path through the bath, roller supporting and advancing means wholly outside of the path of travel of the rollers and means for shielding the roller supporting and advancing means from the bath.

JAMES BAILEY.